INVENTOR.
NORMAN LOWELL
BY
ATTORNEY

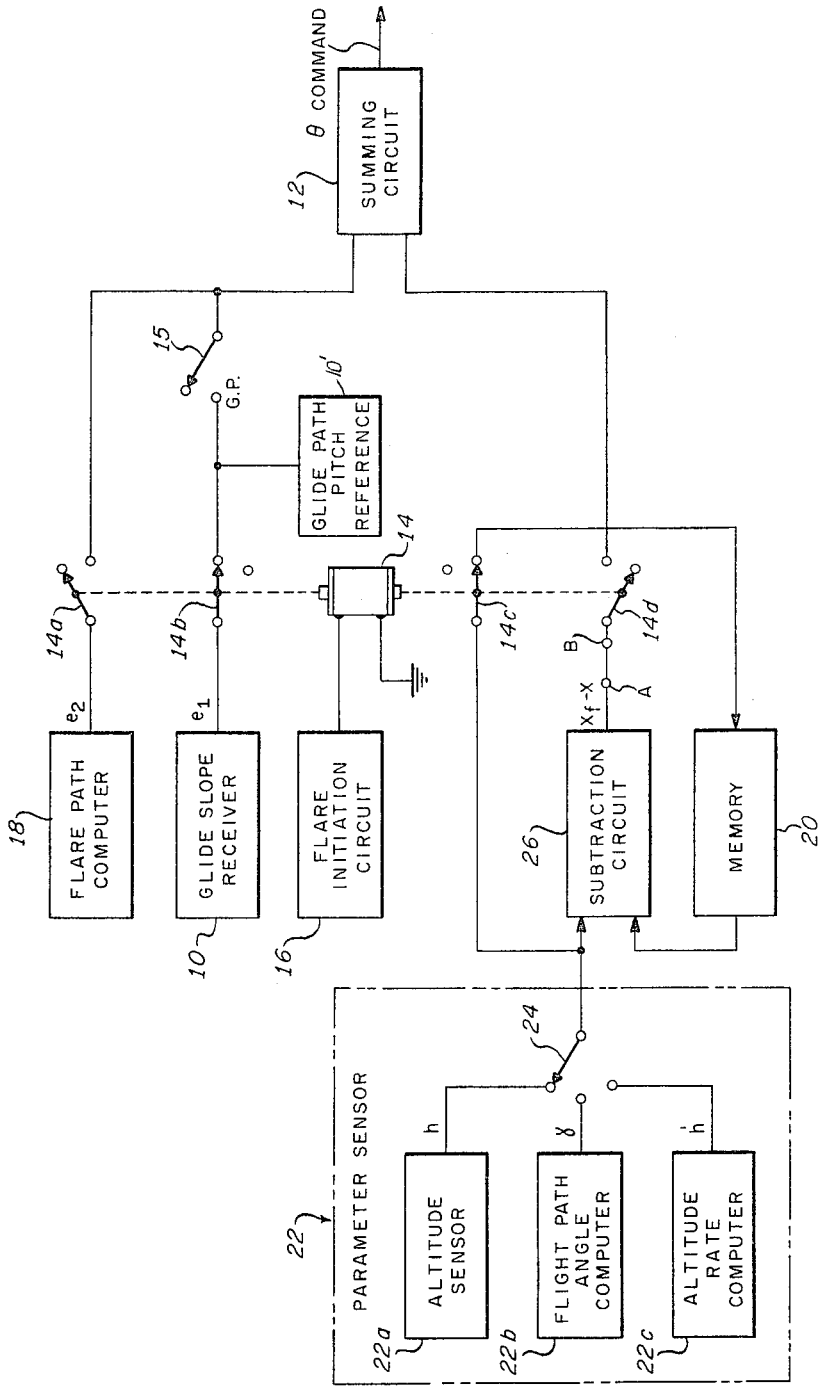

United States Patent Office 3,282,537
Patented Nov. 1, 1966

3,282,537
AIRCRAFT CONTROL SYSTEMS
Norman Lowell, Massapequa, N.Y., assignor to Sperry Rand Corporation, Great Neck, N.Y., a corporation of Delaware
Filed Feb. 26, 1964, Ser. No. 347,582
7 Claims. (Cl. 244—77)

This invention relates in general to aircraft automatic control apparatus and in particular relates to improvements in aircraft landing control systems which operate to control an aircraft through a landing flare-out maneuver. As will be apparent from the discussion below, the invention is not itself a flare path computer, but is instead a means for providing a signal useful in modifying the output signal from any flare path computer which alters the instantaneous path of an aircraft as a function of altitude. For example, the invention may be employed with the self-contained computer of U.S. Patent 3,052,427 or with the computer of U.S. Patent No. 3,169,730 which is assigned to the instant assignee and employs a continuous radio link with the ground.

As to the improvement provided by the instant invention, it is well-known that during the phase of the landing maneuver prior to the flare initiation point, craft pitch trim is usually adjusted (either by directly inserting a bias signal or by generating a bias signal through conventional integral control) from that employed for level flight, whereby the craft flies, for example, a path that makes a predetermined, say 2½° angle with respect to the earth under the guidance of the Instrument Landing System (ILS) and/or a glide slope extension system as disclosed in the above patents. While it is the case that during the flare-out portion of the landing maneuver the craft gradually assumes a path which runs along the surface of the earth, it is desirable, in order to maintain tight path control, that the aforesaid pitch trim adjustment be cancelled for a safe landing. One technique for accomplishing pitch trim cancellation would be the insertion of an equal and opposite bias signal at a predetermined altitude as a step function or over a time period which would allow the nose of the craft to rise in response to the primary flight path computer output signal without opposition from the pitch bias signal. If the pitch bias signal were left in, the attitude of the craft would fall somewhere between that called for by the bias signal and that called for by the flare path computer signal. With such a technique, however, and because there is no relationship between the needed correction to the craft pitch attitude and the instantaneous position of the craft with respect to the ground, such an arbitrary bias correction technique may not be optimum, at times providing a correction which is too severe and at other times providing one which is not severe enough.

By means of the present invention, a pitch trim correction signal is provided in closed loop fashion, i.e. as a function of the steepness of the instantaneous path of the craft during the flare maneuver with respect to the path steepness that was had at the flare initiation point. (Hence, cooperation between the computer means which defines the flare path and the pitch correction apparatus of the present invention is provided, and this being by means of feedback from one to the other.) By continuously applying such a function signal to the pitch channel of the craft automatic flight control system, always the right amount of correction is employed for cancelling the aforementioned adjustment to the craft pitch reference.

As a side advantage of the present technique, control anticipation gets built into the craft automatic flight control system, whereby the craft more easily flies the path defined by the flare path computer, such anticipation also operating to ready the craft for a sudden go-around order, if needed. This will be explained in more detail later.

A principal object of the invention is to provide improvements in automatic landing systems for aircraft.

Another object of the invention is to provide a landing control system for aircraft providing automatic correction of the pitch reference for said craft during landing maneuvers.

Another object of the invention is to provide an aircraft landing control system that provides automatic correction of the pitch reference of said craft in such a way that its ability to fly a defined landing course is enhanced.

Another object of the invention is to provide a landing control system that minimizes dispersion of the touch-down points for an aircraft.

The invention will be described with reference to the figures wherein:

FIG. 2 is a block diagram which provides three embodiments of the invention.

Figure 1A:
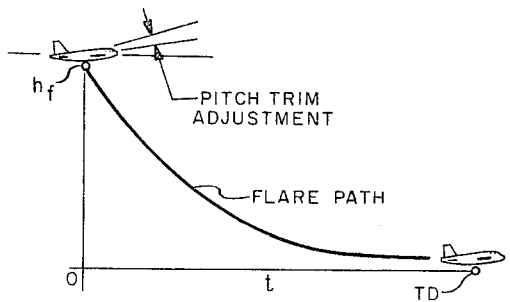
FIGS. 1a through 1d are diagrams useful in describing the invention.

Referring to FIG. 1a, a landing profile for an aircraft is shown having a straight line approach phase (e.g. as provided by ILS) prior to a flare initiation altitude $h_f$, and a curved or flare path phase which brings the craft gradually into contact with the ground at a touchdown point TD.

Figure 1B:
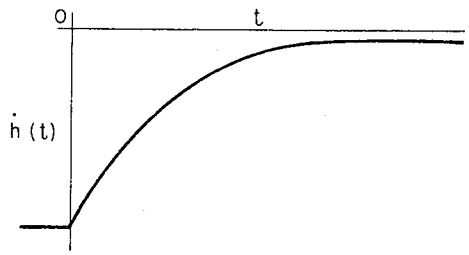
Figure 1C:
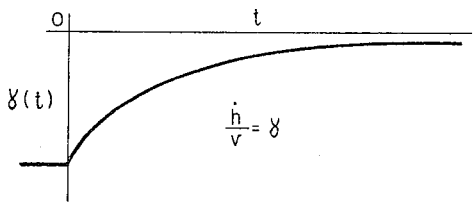
Figure 1D:
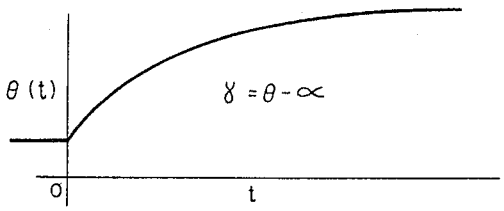

A characteristic of any flare path computer which alters the instantaneous path of a craft as a function of altitude is that once engaged to apply a control signal to the craft automatic flight control system, it not only causes the craft altitude to reduce gradually, but it causes naturally the rate of descent ($\dot{h}$) of the craft similarly to diminish as depicted by FIG. 1b, whereby by definition the craft flight path angle $\gamma$ also gradually diminishes, craft speed $v$ being forced to be constant if the craft is to fly the path to which it is controlled and have its rate of descent controlled by the flare path computer, see FIG. 1c. Since flight path angle $\gamma$ is related directly to the pitch attitude $\theta$ of a craft by means of the definitive equation $\gamma=\theta-\alpha$, similar variations in $\gamma$ and $\theta$ should simultaneously occur (as shown by FIGS. 1c and 1d) for the pitch trim adjustment to be effectively and proportionately cancelled throughout the flare-out maneuver; in other words not only is craft speed $v$ here to be held constant, but so is craft angle of attack $\alpha$.

The invention is founded on the above propositions and makes use of the fact that once the flare path is initiated and flight is controlled thereto by a flare path computer, three separate and distinct parameters (all of which may be used to provide a signal representing the instantaneous path steepness taken with respect to the path steepness at the flare initiation point) are forced to change exactly in the manner that the reference pitch atitude is to be continuously corrected. These are: craft altitude $h$, altitude rate $\dot{h}$, and flight path angle $\gamma$.

Referring now to FIG. 2, a glide slope receiver 10 is shown applying its flight path controlling output signal $e_1$ through a normally closed switch 14b to a summing circuit 12 together with a signal from a glide path pitch reference 10' through a switch 15 which is closed during the glide slope phase and of course remains closed throughout the flare maneuver to avoid any pitch transient at flare initiation. The glide slope pitch reference signal from source 10' may be a bias signal having a value, determined by the steepness of the glide path and aircraft aerodynamics, required for the craft to establish a steady state pitch attitude trim for proper glide slope control. This bias signal may be automatically corrected, if desired, by conventional integral control techniques during the glide slope phase. At a flare initiation altitude $h_f$ the switch 14b is opened by a signal being applied to a relay 14 from a flare point detecting circuit 16, which circuit may be like the flare point detector employed in U.S. Patent 3,052,427. Simultaneously with the opening of the switch 14b, two principal craft control functions come into play: First, a normally open switch 14a closes to apply the output signal $e_2$ from a flare path computer 18 to the summing circuit 12 which tends to force to fly a path as defined by the computer. (The flare path computer 18 may be like the system described in U.S. Patent 3,052,427.) Second, a signal ($X_f$–X), which varies in accordance with the steepness of the flare path at the instant it was initiated relative to the instantaneous steepness of the path of the craft during the flare maneuver, is applied through a now closed but normally open switch 14d (also covered by the flare point sensor 16) to the summing circuit 12, whereby the adjustment to the craft reference pitch attitude is gradually but continuously corrected by the signal ($X_f$–X) thereby permitting the craft to be maintained on the computer-defined flare path without opposition from the pitch bias signal.

In providing a signal ($X_f$–X), where $X_f$ is a signal representative of the magnitude of one of the aforesaid parameters at the flare initiation point $h_f$ and X is a signal representative of the instantaneous magnitude of that parameter, use is made of a memory circuit 20 (e.g. a simple RC circuit) which, so long as the craft is above the flare initiation point $h_f$, receives continuously a parameter representative signal from a sensor 22, such signal being applied to the memory circuit 20 through a normally closed switch 14c. The sensor 22, in accordance with the above teaching, may provide a signal representing altitude $h$ with respect to the ground, or a signal representing instantaneous flight path angle $\gamma$, or a signal representing instantaneous altitude rate $\dot{h}$. For providing an altitude representative signal $h$, the sensor 22 may take the form of an altitude sensor 22a such as is described in U.S. Patent 3,100,858; for providing a flight path angle signal $\gamma$, the sensor 22 may be a computer 22b like that described in U.S. Patent 3,052,122; for providing an altitude rate signal $\dot{h}$ the sensor may take the form of a computer 22c adapted to differentiate an altitude signal $h$ as may be provided by the sensor 22a. A switch 24 is shown applying any one of these path parameter signals not only to the memory circuit 20 via the switch 14c, but also to a subtraction circuit 26, such latter circuit applying during flare-out the pitch attitude compensation signal $X_f$–X (i.e. $h_f$–h, or $\dot{h}_f$–$\dot{h}$, or $\gamma_f$–$\gamma$) through a now closed but normally open switch 14d to the summing circuit 12.

In landing a craft employing the above system, radio control by means of the receiver 10 and glide path pitch reference 10′ brings the craft to the altitude $h_f$, and while so doing the sensor 22 continually applies its output signal, e.g. the altitude signal $h$, to the memory circuit 20. At the instant the altitude $h_f$ is reached, switch 14c opens and the memory circuit at this time provides a stored signal that is representative of the actual flare altitude $h_f$. Now, the craft is controlled in accordance with the output of the flare path computer 18 (switch 14a being now closed), and the craft tends to hold the defined flare path, $e_2$ tending towards zero. Simultaneously, however, the pitch "down" trim bias remains effective through closed switch 15 and therefore tends to hold the nose of the aircraft down. As the craft executes the flare maneuver under control of the flare path computer 18, the subtraction circuit 26 will provide an output signal which gradually increases, since $h_f$ is fixed and $h$ decreases gradually. With an increasing signal ($h_f$–h) being applied continuously to the summing circuit 12, it tends gradually to cancel the nose down bias thereby permitting the craft automatic flight control system pitch channel via the summing circuit 12 gradually to change the craft pitch attitude reference required to the aircraft path angle from 2.5° to 0° at touchdown.

In effect, the aircraft flare maneuver is automatically controlled in accordance with the operation of two closed loop, mutually interdependent systems, the one loop constituting the flare path computer, its sensors and the aircraft control system and the other constituting the sensors 22, the glide path pitch reference 10′ and the aircraft control system. The first loop computes the path and tends to force the aircraft to follow this path through the pitch channel of the autopilot while the other loop measures at least one of the characteristics of the approach path, for example, change of altitude $h$ from the initial flare altitude $h_f$, and generates a control signal which tends to cancel the glide path pitch reference bias thereby allowing the nose of the craft to rise in response to the computed path commands. As stated previously, the latter loop provides a pitch anticipation term whereby to allow the pitch attitude to change in accordance with the flare path computer command without opposition.

Due to the fact that a nose up pitch signal which tends to cancel the "nose down" pitch bias signal is continuously applied to the automatic flight control system pitch channel during flare the craft tends to follow more easily the computed flare path. That is, the output $e_2$ from the path computer 18 tends to remain close to zero. Also, were the pilot to feel a need for a go-around during the flare-out phase of the landing maneuver, the fact that the craft is already in the process of nosing up allows such go-around to be more easily and safely made.

Figure 3:
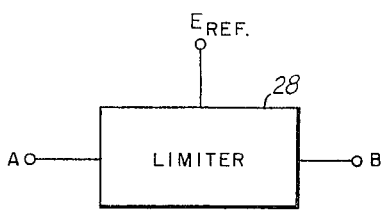
FIG. 3 shows an element which when included in the apparatus of FIG. 2 provides a presently preferred form of the invention.

With many flare path computers, the craft may tend to float above the runway during the final seconds before touchdown, such being the result of ordering a very low rate of descent while flying substantially parallel to the earth. This naturally makes the craft touchdown point quite dependent on wind conditions near the runway. To overcome this, the present invention in its presently preferred form proposes that the signal $X_f$–X be limited by means of a limiter 28 (see FIG. 3) being connected to FIG. 2 points A and B, whereby the aforesaid pitch trim adjustment will not be completely cancelled by the subtraction circuit 26 output signal. Attendant upon this is that since the pitch anticipation signal from sensor 22 is a function of altitude, limiting the altitude signal limits the pitch up attitude of the craft and hence a change of altitude must result, i.e., a slight positive rate of descent is provided right near touchdown, and touchdown dispersion is minimized.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a landing control system for aircraft, the combination comprising:
    (a) means for producing a reference pitch attitude signal adapted to control an aircraft to maintain a substantially linear approach path to a predetermined flare-out altitude,
    (b) means for producing a second signal adapted to control said aircraft to maintain a predetermined flare-out path,
    (c) means for producing a third signal proportional to the difference between the steepness of the flare-out path at said predetermined altitude and the instantaneous steepness of the flare-out path below said predetermined altitude,
    (d) and autopilot means responsive to said reference attitude signal for controlling said craft above said predetermined altitude and responsive to said reference attitude signal and said second and third signals for controlling said craft below said predetermined altitude, said reference attitude signal and said third signal being of a sense such that they mutually oppose one another, whereby the path of said craft below said predetermined altitude is controlled primarily by said second signal without opposition from said pitch attitude reference signal.

2. In a system for automatically controlling an aircraft throughout an approach and flare-out maneuver, the combination comprising:
   (a) means for initially controlling the craft to follow a predetermined glide slope path,
   (b) means providing a reference pitch attitude signal commensurate with the pitch attitude required to maintain said path,
   (c) means including switching means operable at a predetermined altitude for terminating control by said initial control means and thereafter controlling said craft to follow a predetermined flare-out path substantially less steep than said initial path,
   (d) means responsive to a characteristic of said flare-out path for generating a signal corresponding to said characteristic, and
   (e) means also operable with said switching means for combining said last mentioned signal and said reference pitch attitude signal in mutually opposing relation whereby gradually to substantially eliminate said reference pitch attitude signal as said craft follows said flare-out path.

3. The apparatus as set forth in claim 2 wherein the means responsive to said flare-out path characteristic comprises means for providing a signal corresponding to the change in altitude of said craft from said predetermined altitude.

4. The apparatus as set forth in claim 2 wherein the means responsive to said flare-out path characteristic comprises means for providing a signal corresponding to the rate of change of altitude of said craft from that obtaining at said predetermined altitude.

5. The apparatus as set forth in claim 2 wherein the means responsive to said flare-out path characteristic comprises means for providing a signal corresponding to the change in the flight path angle of said craft from that obtaining at said predetermined altitude.

6. The apparatus as set forth in claim 2 further including means responsive to said flare-out path characteristic signal for limiting the magnitude thereof to a predetermined magnitude.

7. In a system for automatically controlling an aircraft throughout an approach and flare-out maneuver, the combination comprising:
   (a) means for initially controlling the craft to follow a predetermined glide slope path,
   (b) means providing a reference pitch attitude signal commensurate with the pitch attitude required to maintain said path,
   (c) means including switching means operable at a predetermined altitude for terminating control by said initial control means and thereafter controlling said craft to follow a flare-out path substantially less steep than said initial path,
   (d) means responsive to the altitude of said craft at said predetermined altitude for providing a substantially constant signal proportional thereto,
   (e) means responsive to the actual instantaneous altitude of said craft for providing a signal proportional thereto,
   (f) means for combining said last two mentioned signals for providing a signal proportional to the difference therebetween, and
   (g) means responsive to the operation of said switching means for combining said difference signal and said reference pitch attitude signal in mutually opposing relation during said flare-out maneuver.

References Cited by the Examiner
UNITED STATES PATENTS 2,987,275   6/1961   Moncrief-Yeates et al. __ 244—77
3,115,319  12/1963  Glaser et al. _____ 244—77

FERGUS S. MIDDLETON, *Primary Examiner.*